United States Patent
Hurst et al.

(10) Patent No.: US 8,403,429 B2
(45) Date of Patent: Mar. 26, 2013

(54) BALANCED BRAKE CONTROL SYSTEM

(75) Inventors: Richard P. Hurst, Hartville, OH (US); Arnold A. Beck, Clinton, OH (US)

(73) Assignee: Meggitt Aircraft Braking Systems, Akron, OH (US)

( * ) Notice: Subject to any disclaimer, the term of this patent is extended or adjusted under 35 U.S.C. 154(b) by 65 days.

(21) Appl. No.: 13/087,412

(22) Filed: Apr. 15, 2011

(65) Prior Publication Data
US 2012/0261980 A1    Oct. 18, 2012

(51) Int. Cl.
*B60T 8/78* (2006.01)
(52) U.S. Cl. .................................... 303/126
(58) Field of Classification Search .......... 303/3, 122.03–122.07, 126; 244/111
See application file for complete search history.

(56) References Cited

U.S. PATENT DOCUMENTS

| | | | | |
|---|---|---|---|---|
| 4,078,845 A | * | 3/1978 | Amberg et al. | 303/164 |
| 5,024,491 A | * | 6/1991 | Pease et al. | 303/195 |
| 5,417,477 A | * | 5/1995 | Lasbleis | 303/3 |

* cited by examiner

*Primary Examiner* — Christopher Schwartz
(74) *Attorney, Agent, or Firm* — Renner, Kenner, Greive, Bobak, Taylor & Weber

(57) ABSTRACT

A balanced brake control system is provided for use in aircraft. An embodiment of the invention is presented for an aircraft having struts with both inboard and outboard braked wheels on the struts. In the detailed embodiment, an equalizer circuit is interposed between right and left brake pedals on an input side thereof and right and left inboard and outboard brakes on an output side thereof. This equalizer circuit ensures a first equal application of brake pressure to the right inboard and outboard brakes and a second equal application of brake pressure to the left inboard and outboard brakes, dependent upon pilot control of brake pedals. The first and second equal applications of brake pressure may differ to accommodate differential braking.

20 Claims, 2 Drawing Sheets

BALANCED BRAKE CONTROL SYSTEM

TECHNICAL FIELD

The invention herein relates to brake control systems for vehicles and, more particularly, to brake control systems for aircraft. More specifically, the invention is directed to a balanced brake control system ensuring uniformity of brake application between inboard and outboard brakes on a strut.

BACKGROUND OF THE INVENTION

Aircraft are often configured with multiple wheels on a strut, each having associated brakes. In the context of the discussion herein, inboard wheels and brakes on a strut are those closest to the main axis of the aircraft fuselage, while outboard wheels and brakes on a strut are those most distant from such axis.

In some aircraft, it has been noted that during certain braking activities, one set of brakes, typically the inboard or outboard brakes do virtually all of the braking, while a remaining set, such as the outboard or inboard brakes have little or no pressure applied above that necessary for lining contact. As a consequence of the disparity of braking activity on the struts themselves, uneven braking activity may result, particularly at low pedal application. Moreover, since the wear of carbon brakes is aggravated in low torque situations, a disparity between brake wear rates on a single strut or aircraft may result, giving rise to service complications and efficiency losses.

There is a need in the art for a balanced brake control system that ensures uniform application of brake pressure and resulting brake activity on the various wheels of a strut, ensuring uniform brake control and wear, without sacrificing maneuverability.

DISCLOSURE OF INVENTION

In light of the foregoing, it is a first aspect of the invention to provide a balanced brake control system for an aircraft in which uniform braking activity is ensured for each of the braked wheels on a strut.

Another aspect of the invention is the provision of a balanced brake control system for an aircraft in which uniform braking activity between sets of wheels, such as the inboard and outboard wheels on a strut is achieved, without interference with aircraft maneuverability.

Still a further aspect of the invention is the provision of a balanced brake control system for an aircraft in which sets of braking systems, such as the inboard and outboard braking systems of the aircraft are cross coupled, forcing the inboard and outboard brakes on a strut to react similarly during braking applications.

Yet a further aspect of the invention is the provision of a balanced brake control system for an aircraft in which differential braking remains possible, while ensuring equal brake application to the brakes of wheels of a common strut.

Another aspect of the invention is the provision of a balanced brake control system for an aircraft in which data of the braked wheels of an aircraft is shared among those braked wheels to ensure uniform braking application while accommodating differential braking control.

The foregoing and other aspects of the invention that will become apparent as the detailed description proceeds are achieved by a balanced brake control system for an aircraft, comprising: a right brake pedal producing a right brake command signal; a left brake pedal producing a left brake command signal; a first brake and a second brake comprising a first set of brakes; a third brake and a fourth brake comprising a second set of brakes; and an equalizer circuit interposed between said right and left brake pedals on an input side thereof, and said first and second sets of brakes on an output side thereof, said equalizer circuit ensuring a first equal application of brake pressure to a first subset of brakes taken from said first and second sets of brakes and a second equal application of brake pressure to a second different subset of brakes taken from said first and second sets of brakes.

Other aspects of the invention that will become apparent herein are achieved by a balanced brake control system for an aircraft, comprising: a right brake pedal producing a right brake command signal; a left brake pedal producing a left brake command signal; a plurality of right and left inboard brakes; a plurality of right and left outboard brakes; and an equalizer circuit interposed between said right and left brake pedals on an input side thereof, and said pluralities of right and left inboard and outboard brakes on an output side thereof, said equalizer circuit ensuring a first equal application of brake pressure to said plurality of right inboard and outboard brakes and a second equal application of brake pressure to said plurality of left inboard and outboard brakes.

DESCRIPTION OF DRAWINGS

For a complete understanding of various structures and techniques of embodiments of the invention, reference should be made to the following detailed description and accompanying drawings wherein.

BEST MODE FOR CARRYING OUT THE INVENTION

Figure 1:
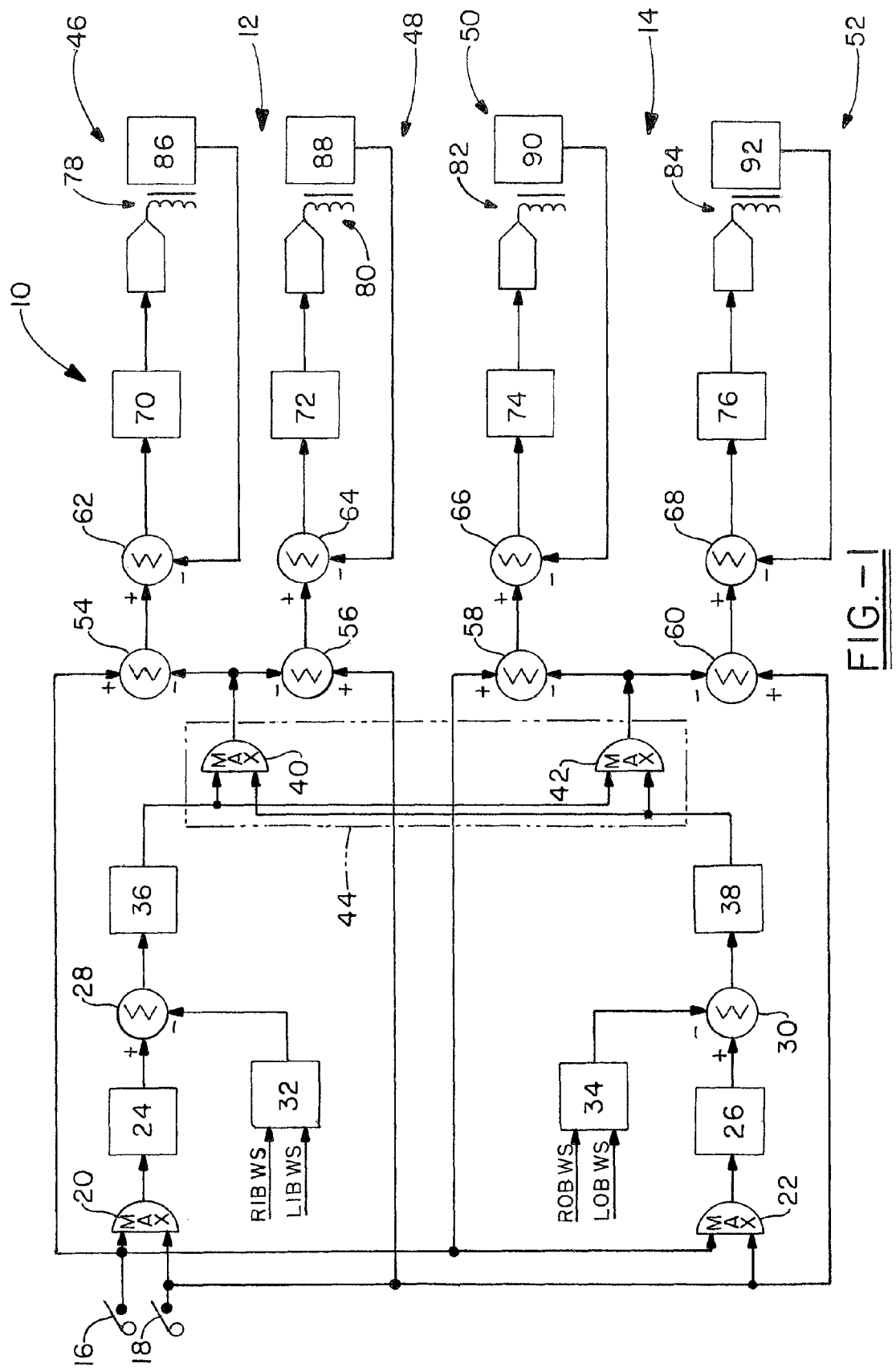
FIG. 1 is a schematic diagram of a first embodiment of a balanced brake control system made in accordance with the invention.

Referring now to the drawings and more particularly FIG. 1, it can be seen that a deceleration feedback control system for aircraft brakes is designated generally by the numeral 10. It will be appreciated that the concept of the invention is presented herein in the context of an aircraft deceleration control system, but the invention is equally applicable to slip, torque, or various other types of brake control systems. Only for purposes of presentation is the invention configured in the context of a deceleration control system. Additionally, the embodiment described is adapted for an aircraft with two struts, each having a pair of wheels, but the concept of the invention extends to the sharing and utilization of data among any number of braked wheels to ensure uniform braking activity, while accommodating differential braking control. Yet further, examples of the invention are presented herein with regard to the balancing and uniformity of braking effort between inboard and outboard brakes, but the concept of the invention extends to achieving such balancing and uniformity between sets of brakes at any of various locations on an aircraft, such as sets of fore and aft, left and right, inner and outer, and the like.

The control system 10 is divided into an inboard system 12 associated with the brakes of the inboard wheels on the struts of the aircraft, and an outboard system 14 associated with the brakes of the outboard wheels on such struts. Of course, and as presented above, the control system 10 might be otherwise divided in keeping with the concept of the invention.

In somewhat standard fashion, a right brake control pedal 16 and left brake control pedal 18 are provided to allow pilot control of the braking torque, slip or deceleration by means of the presentation of a brake command signal. The outputs of the pedals 16, 18 are provided as inputs to max filter/comparator circuits 20, 22, allowing as an output the maximum brake command signal from the right and left pedals 16, 18. This maximum signal is passed through scaling and filtering circuits 24, 26, the outputs of which are introduced to the positive input of summers 28, 30, as shown. Accordingly, the positive inputs of the summers 28, 30 receive as a reference a signal corresponding to the greater of the decelerations requested by the pedals 16, 18. The negative inputs to the summers 28, 30 are the outputs of differentiators/filters 32, 34. The differentiator/filter 32 receives as an input wheel speed signals corresponding to the instantaneous wheel speed of the right and left inboard wheels on the struts of the aircraft. Similarly, the differentiator/filter 34 receives as inputs the instantaneous wheel speed signals of the right and left outboard wheels of the struts. By differentiating and filtering the signals, the circuits 32, 34 emit output signals corresponding to instantaneous aircraft deceleration as determined by inboard wheel speeds (circuit 32) and outboard wheel speeds (circuit 34).

The outputs of the summers 28, 30 are respectively fed to deceleration feedback control circuits 36, 38 which, as well known in the art, comprise proportional-integral-derivative control circuits that generate as outputs thereof control signals corresponding to a required brake pressure to achieve a desired rate of deceleration as dictated by the pedals 16, 18. A pair of max filters/comparators 40, 42 receive the outputs of the deceleration feedback control circuits 36, 38 and present as outputs the maximum value of the inputs. Accordingly, the outputs of the max filters/comparators 40, 42 are the same, the output from the circuit 40 serving the inboard system 12 and the output of the circuit 42 serving the outboard system 14. Accordingly, a deceleration control reference signal, and hence the brake pressure demand signal, are the same for both the inboard system 12 and the outboard system 14.

It will be appreciated that the max filters/comparators 40, 42 comprise an equalizer circuit 44 that cross couples the outputs of the deceleration feedback control circuits 36, 38 to force the brake control reference signal, and hence the brake pressure demand signal, for both the inboard and outboard systems to be the same. As shown in FIG. 1, these identical signals are applied to a right inboard brake pressure control circuit 46, left inboard brake pressure control circuit 48, right outboard brake pressure control circuit 50 and left outboard brake pressure control circuit 52. These circuits 46, 48, 50, 52 receive brake command signals from associated brake pedals 16, 18 augmented by the output of the equalizer circuit 44 as by the summer circuits 54, 56, 58, 60.

As shown, the positive input of each of the summer circuits 54, 56, 58, 60 is a respective brake command signal from the associated pedals 16, 18. The negative input of each of the summer circuits 54, 60 is the output of equalizer circuit 44, which is a brake control reference signal. Accordingly, the output of each of the summer circuits 54, 56, 58, 60 is a brake command signal of an associated pedal augmented by the output of the equalizer circuit 44, ensuring the capability of differential braking as between struts. In other words, the brakes on the left side of the aircraft may have a different forceful application than those on the right, to accommodate steering, maneuvering and the like.

The outputs of summer circuits 54, 56, 58, 60 are respectively applied to the positive inputs of summer circuits 62, 64, 66, 68. The negative input to these summer circuits is a pressure feedback signal of an associated brake, taken from an appropriate pressure transducer associated with the brake. Accordingly, the outputs of the summer circuits 62, 64, 66, 68 are brake pressure demand signals applied to each of compensation circuits 70, 72, 74, 76 which generate brake pressure control signals that are scaled for application to associated brake valves 78, 80, 82, 84, each having an associated valve driver. These brake valves control the application and release of brake pressure to associated brake assemblies 86, 88, 90, 92 of associated wheels.

The balanced brake control system of FIG. 1, with the implementation of the equalizer circuit 44, ensures that the right inboard brake 86 and right outboard brake 90 receive the same brake pressure control signal at the respectively associated valves 78, 82. Similarly, the left inboard brake assembly 88 and left outboard brake assembly 92 receive the same brake pressure control signal at the associated valves 80, 84. Thus, inboard and outboard brakes on a common strut receive the same brake force application, while different struts are still capable of exercising different braking activity to accommodate differential braking as desired for steering, maneuverability and the like.

Figure 2:
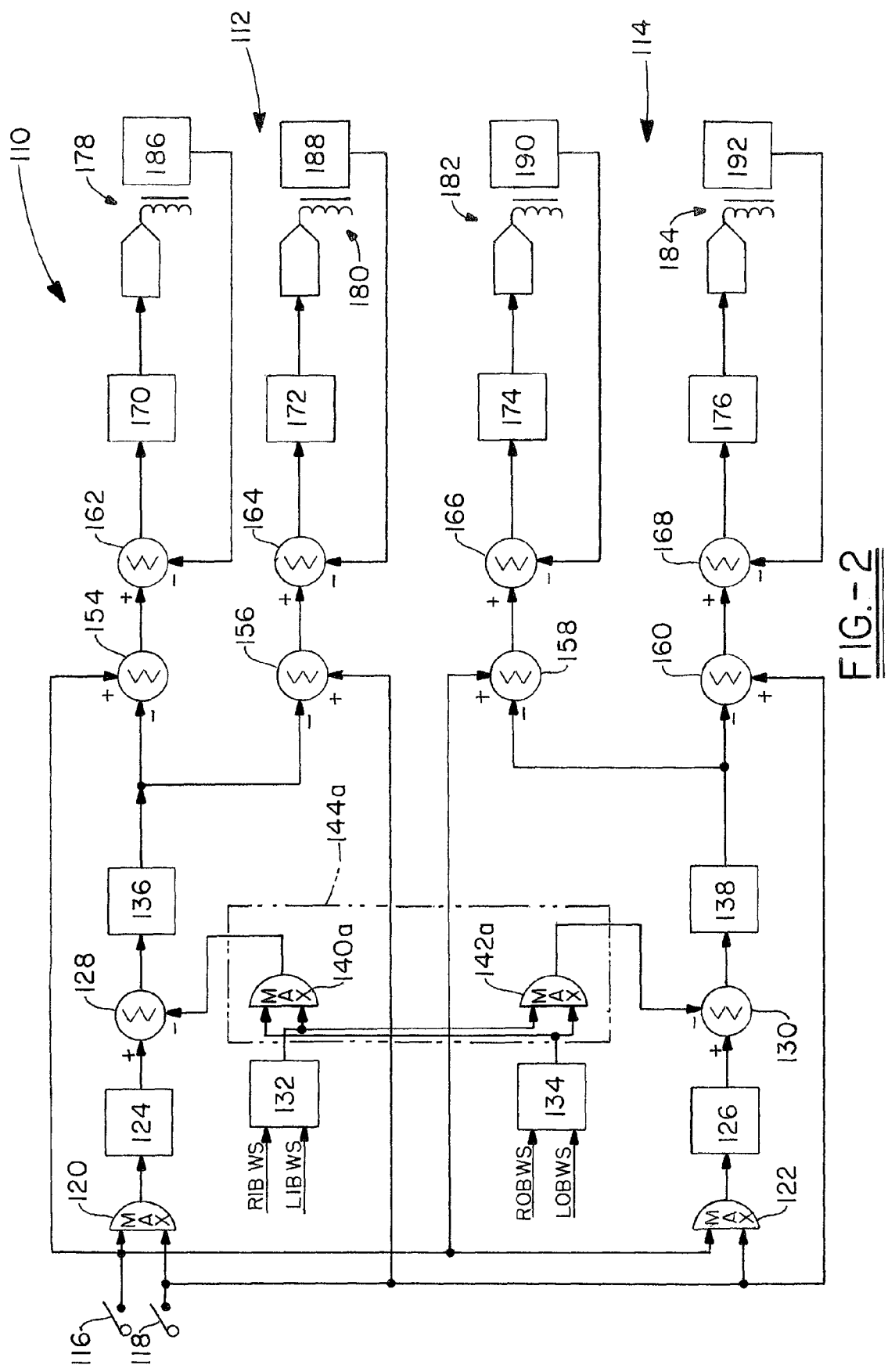
FIG. 2 is a schematic diagram of a second embodiment of a balanced brake control system made according to the invention

With reference now to FIG. 2, it can be seen that a second embodiment of the invention is designated generally by the numeral 110. Again, the invention is shown in the context of a deceleration feedback control system for aircraft brakes, but the concept of the invention is again equally applicable to aircraft braking based on slip, torque, or other type signals. It will also be noted that the system 110 is substantially identical to the system 10 of FIG. 1, accounting for the use of the same reference numerals, indexed by the number 100. In the embodiment of FIG. 2, the equalizer circuit 144a, consisting of max filters/comparators 140a, 142a, is positioned upstream of its location in the system 10 of FIG. 1. The equalizer circuit 144a receives and operates upon cross coupled outputs of differentiators/filters 132, 134, the outputs of which correspond to calculated instantaneous aircraft deceleration. In the embodiment of FIG. 2, the outputs of the differentiators/filters 132, 134 are provided to the max filters/comparators 140a, 142a, such that the negative inputs to the summers 128, 130 are the same value and represent the instantaneous aircraft deceleration rather than the deceleration feedback control signals as in FIG. 1. All other functions and operations of the circuit 110 are substantially the same as apparent from the description of the circuit 10 presented above. The primary difference between the embodiments of FIGS. 1 and 2 is the placement of the equalizer circuit, and the signals upon which it operates.

It will be appreciated by those skilled in the art that the invention described and presented herein may be in any number of configurations and implementations beyond the embodiments of FIGS. 1 and 2. Any of various types of control signals, and control circuitry may be employed to assure brake equalization among any number of wheels, while allowing for differential braking as discussed above.

Thus it can be seen that the aspects of the invention have been satisfied by the structures and techniques presented above. While in accordance with the patent statutes only the best known and preferred embodiments of the invention have been presented and described in detail, it is to be understood that the invention is not limited thereto or thereby. Accordingly, for an appreciation of the scope and breadth of the invention reference should be made to the following claims.

What is claimed is:

1. A balanced brake control system for an aircraft, comprising:
   a right brake pedal producing a right brake command signal;
   a left brake pedal producing a left brake command signal;
   a first brake and a second brake comprising a first set of brakes;
   a third brake and a fourth brake comprising a second set of brakes; and
   an equalizer circuit interposed between said right and left brake pedals on an input side thereof, and said first and second sets of brakes on an output side thereof, said equalizer circuit ensuring a first equal application of brake pressure to a first subset of brakes of said first and second sets of brakes and a second equal application of brake pressure to a second different subset of brakes of said first and second sets of brakes.

2. The balanced brake control system for an aircraft according to claim 1, wherein said first equal application of brake pressure is in response to said right brake command signal and said second equal application of brake pressure is in response to said left brake command signal.

3. The balanced brake control system for an aircraft according to claim 2, wherein said left and right brake command signals are augmented by respective first and second aircraft braking activity signals to generate first and second brake control signals applied to said equalizer circuit, said equalizer circuit providing a brake control reference signal to said first and second subsets of brakes.

4. The balanced brake control system for an aircraft according to claim 3, wherein said brake control reference signal is a function of one of said first and second brake control signals.

5. The balanced brake control system for an aircraft according to claim 4, wherein said brake control reference signal is augmented by said left brake command signal to generate a first brake pressure signal that is applied to brake valves of said second subset of brakes, and said brake control reference signal is augmented by said right brake command signal to generate a second brake pressure signal that is applied to brake valves of said first subset of brakes.

6. The balanced brake control system for an aircraft according to claim 5, wherein each of said brakes has an associated brake pressure sensor generating an associated brake pressure feedback signal to augment an associated one of said brake pressure signals.

7. The balanced brake control system for an aircraft according to claim 5, wherein said first and second brake control signals comprise deceleration signals.

8. The balanced brake control system for an aircraft according to claim 7, wherein said first and second aircraft braking activity signals comprise aircraft deceleration signals respectively calculated from wheel speeds associated with said first and second sets of brakes.

9. The balanced brake control system for an aircraft according to claim 2, wherein said first and second equal applications of brake pressure are different when accommodating differential braking.

10. The balanced brake control system for an aircraft according to claim 2, wherein said equalizer circuit receives as a first input an aircraft deceleration signal calculated as a function of wheel speeds of wheels associated with said first set of brakes, and as a second input an aircraft deceleration signal calculated as a function of wheel speeds of wheels associated with said second set of brakes.

11. The balanced brake control system for an aircraft according to claim 10, wherein said equalizer circuit provides as an output one of said first and second inputs as an aircraft deceleration signal.

12. The balanced brake control system for an aircraft according to claim 11, wherein said aircraft deceleration signal is augmented by one of said right and left brake command signals to create control signals corresponding to required brake pressures.

13. A balanced brake control system for an aircraft, comprising:
    a right brake pedal producing a right brake command signal;
    a left brake pedal producing a left brake command signal;
    a plurality of right and left inboard brakes;
    a plurality of right and left outboard brakes; and
    an equalizer circuit interposed between said right and left brake pedals on an input side thereof, and said pluralities of right and left inboard and outboard brakes on an output side thereof, said equalizer circuit ensuring a first equal application of brake pressure to said plurality of right inboard and outboard brakes and a second equal application of brake pressure to said plurality of left inboard and outboard brakes.

14. The balanced brake control system for an aircraft according to claim 13, wherein said first equal application of brake pressure is in response to said right brake command signal and said second equal application of brake pressure is in response to said left brake command signal.

15. The balanced brake control system for an aircraft according to claim 14, wherein said left and right brake command signals are augmented by respective first and second aircraft braking activity signals to generate first and second brake control signals applied to said equalizer circuit, said equalizer circuit providing a brake control reference signal to said plurality of right and left inboard and outboard brakes.

16. The balanced brake control system for an aircraft according to claim 15, wherein said brake control reference signal is augmented by said left brake command signal to generate a first brake pressure signal that is applied to brake valves of said plurality of left inboard and outboard brakes, and said brake control reference signal is augmented by said right brake command signal to generate a second brake pressure signal that is applied to brake valves of said plurality of right inboard and outboard brakes.

17. The balanced brake control system for an aircraft according to claim 14, wherein said first and second equal applications of brake pressure are different when accommodating differential braking.

18. The balanced brake control system for an aircraft according to claim 14, wherein said equalizer circuit receives as a first input an aircraft deceleration signal calculated as function of wheel speeds of at least certain of said right and left inboard wheels associated with said right and left inboard brakes, and as a second input an aircraft deceleration signal calculated as a function of wheel speeds of at least certain of said right and left outboard wheels associated with said right and left outboard brakes.

19. The balanced brake control system for an aircraft according to claim 18, wherein said equalizer circuit provides as an output the larger of said first and second inputs as an aircraft deceleration signal.

20. The balanced brake control system for an aircraft according to claim 19, wherein said aircraft deceleration signal is augmented by a larger of said right and left brake command signals to create control signals corresponding to required brake pressures.

\* \* \* \* \*